US012711036B2

(12) United States Patent
Spiegler et al.

(10) Patent No.: US 12,711,036 B2
(45) Date of Patent: Aug. 18, 2026

(54) DYNAMIC LOG LEVEL ADJUSTMENT FOR DEBUG SESSIONS

(71) Applicant: SAP SE, Walldorf (DE)

(72) Inventors: Tom Spiegler, Langebrück (DE); Franz Josef Grueneberger, Dresden (DE); Henning Zahn, Mühlenbeck (DE)

(73) Assignee: SAP SE, Walldorf (DE)

( * ) Notice: Subject to any disclaimer, the term of this patent is extended or adjusted under 35 U.S.C. 154(b) by 50 days.

(21) Appl. No.: 18/922,246

(22) Filed: Oct. 21, 2024

(65) Prior Publication Data

US 2026/0111337 A1 Apr. 23, 2026

(51) Int. Cl.
*G06F 11/34* (2006.01)
*G06F 11/362* (2025.01)

(52) U.S. Cl.
CPC ........ *G06F 11/3476* (2013.01); *G06F 11/362* (2013.01)

(58) Field of Classification Search
CPC ........................... G06F 11/3476; G06F 11/362
See application file for complete search history.

(56) References Cited

U.S. PATENT DOCUMENTS 9,697,104 B2 7/2017 Obermiller et al.
2021/0311854 A1* 10/2021 Odnopozov ........ G06F 11/3698
2024/0143473 A1* 5/2024 Lim .................... G06F 11/3006

* cited by examiner

*Primary Examiner* — Suraj M Joshi
(74) *Attorney, Agent, or Firm* — Klarquist Sparkman, LLP

(57) ABSTRACT

Dynamic logging adjustment can be performed during a debug session to facilitate issue resolution. A user of a software platform can initiate a debug session with a specified logging profile. The logging profile includes respective log levels for backend components of the software platform which only apply to server requests associated with the debug session. During the debug session, the user attempts to reproduce the issue which triggers corresponding server requests. The server determines whether a given server request is part of the debug session, and if so, dynamically adjusts the log level for actions associated with the server request. A debug session identifier for the debug session is inserted in log entries associated with the server request. After the debug session has concluded, server logs can be filtered by the debug session identifier to obtain a targeted set of log entries pertaining to the issue.

20 Claims, 9 Drawing Sheets

400

DYNAMIC LOG LEVEL ADJUSTMENT FOR DEBUG SESSIONS

FIELD

The field generally relates to debugging issues encountered by users of software applications.

BACKGROUND

Users of software applications may encounter issues (e.g., problems or unexpected behaviors that affect the functionality, performance, or user experience of the application). Some of these issues are coding issues; in order to identify the root cause, developers typically attempt to reproduce the issue and debug the application. However, existing techniques for reproducing and debugging issues observed by users suffer from various drawbacks. For example, a developer can inspect and analyze the error logs of the application. While this approach is sometimes sufficient to identify the issue, it is ineffective when the root cause is not an error but rather an incorrect control flow, a data inconsistency, or another issue which does not trigger error-level log entries. Since no error is raised, the error logs may not contain any relevant information.

Another technique for reproducing and debugging an issue observed by a user involves having a client-side support user attempt to reproduce the issue on the productive system. In this case, the user must grant the appropriate roles and permissions to the support user. On the one hand, the support user must be sufficiently privileged to reproduce the scenario, which may require file access. On the other hand, giving the support user too many privileges can lead to the support user being unable to reproduce the issue at all (e.g., because the issue is not reproducible for a user with administrator level privileges).

In yet another technique for reproducing and debugging an issue observed by a user, a developer can request an export of user data to reproduce the issue in their local development environment. However, the export may not include certain required information such as users or user privileges. In addition, the development environment may not be as complete as a productive system (e.g., the productive system may include microservices which are not present in the development environment). Finally, the user may reject the request because the affected data is confidential or contains personal data which should not leave the client system.

DETAILED DESCRIPTION

Example 1—Overview

Figure 1:
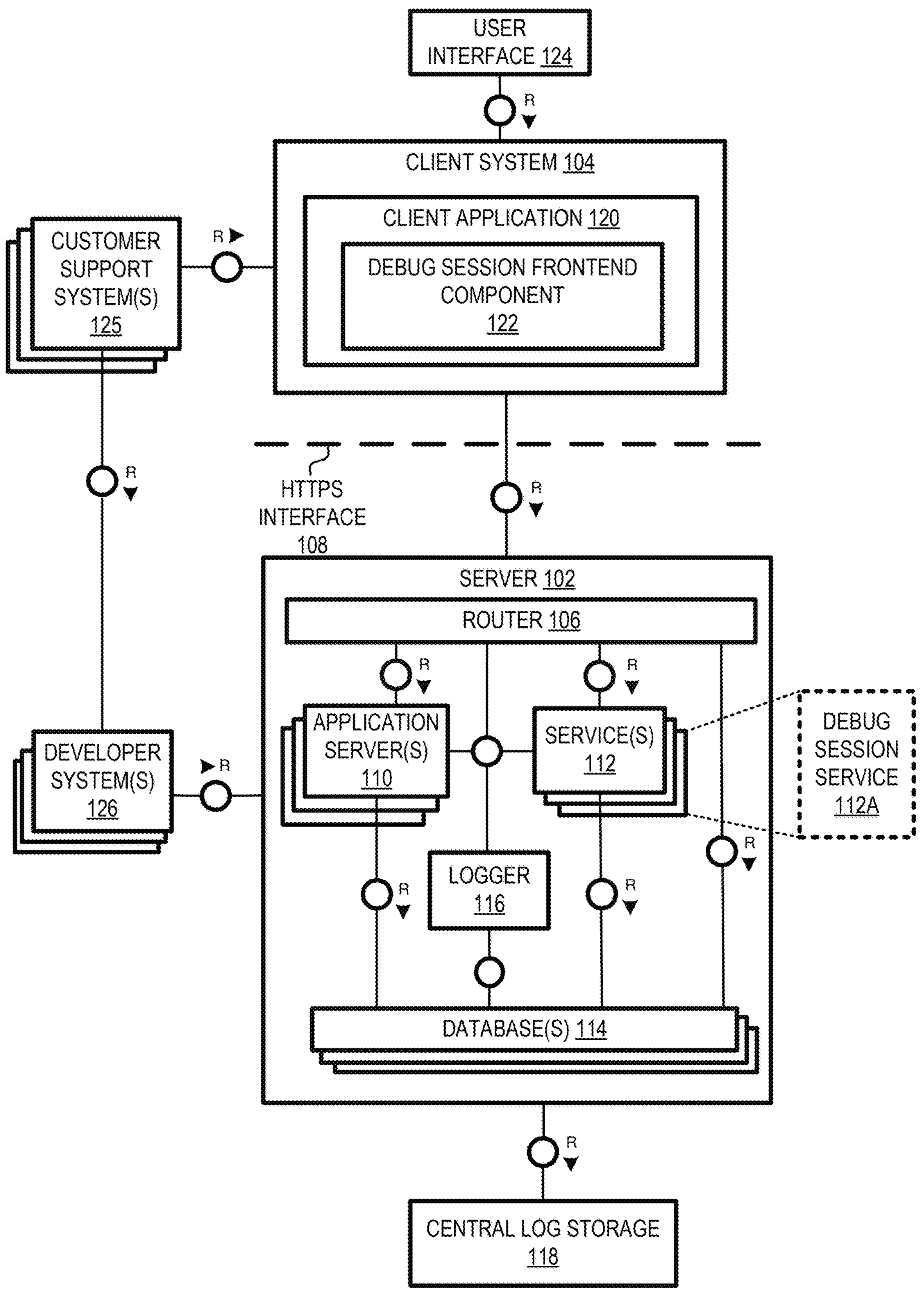
FIG. 1 is a block diagram of an example system implementing dynamic log level adjustment for debug sessions.

An issue encountered by a user of a software platform can be debugged by establishing a debug session with dynamic log level adjustment. During the debug session, while the user attempts to reproduce the issue, log levels for server requests that are part of the debug session are adjusted in accordance with a logging profile specified in a debug session configuration for the debug session. In contrast, log levels for server requests which are not part of the debug session are not adjusted in accordance with the logging profile. A debug session identifier for the debug session is inserted in the log entries for the server requests that are part of the debug session. Accordingly, logs can be easily filtered to the log entries relevant to the debug session using the debug session identifier, thereby facilitating resolution of the issue.

By dynamically adjusting log levels during the debug session only for server requests associated with the debug session, problems associated with indiscriminately increasing log levels can be reduced. For example, if error logs are not sufficient to determine the root cause of an issue experienced by a user, developers may globally increase the log level of an application and then ask the user to reproduce the issue. However, globally increasing log levels can generate an enormous amount of log entries (e.g., because all incoming server-requests follow the increased log level). This can be especially problematic in busy systems with numerous active users; due to the large quantity of log files generated, the developer may not be able to identify the relevant log entries in the log files. The performance of the application may also be degraded because detailed logs come with a performance overhead which can negatively affect all users of the system. In addition, log files may be deleted in this situation because their size has exceeded a predefined threshold.

In accordance with the techniques described herein, a user can initiate a debug session to reproduce an issue they are experiencing during use of a software platform. For example, the user may submit a support ticket to customer support (e.g., a customer support team comprising one or more support users). A support user may share the support ticket with one or more developers and receive feedback from the developer(s) indicating that a debug session would be helpful to debug the issue. Alternatively, the support user may independently conclude that a debug session would be helpful. In either case, the support user instructs the user to initiate a debug session and attempt to reproduce the issue during the debug session.

A user can initiate a debug session via a user interface (UI) of a client application associated with the software platform. For example, the user can input a request to initiate the debug session. Optionally, the request can include configuration data for the debug session. As one example, a list of workflows can be displayed via the UI, and the user can select the workflow where the issue occurred. The client application can then determine an appropriate logging profile for the debug session based on the selected workflow included in the request. Such operation can ease the debug experience for users by allowing them to configure the debug session on a relatively high level (e.g., as opposed to requiring the user to select the appropriate log levels for individual backend components).

The logging profile determined by the client application based on the configuration data can specify respective log levels for backend components of the software platform for actions associated with server requests that are part of the debug session. The log levels specified in the logging profile for one or more backend components may be different log levels; alternatively, the logging profile may specify that all backend components generate log entries at the same log level (e.g., a debug log level).

As another example, a list of overall log levels for the debug session (e.g., low, medium, and high) can be displayed via the UI for selection by the user. The client application can then determine an appropriate logging profile for the debug session based on the selected overall log level included in the request. As yet another example, a list of custom log levels can be displayed via the UI for selection by the user. A given custom log level may be associated with respective individual log levels for one or more backend components, or for one or more types of backend components.

Alternatively, the request to initiate the debug session may not include configuration data that is used to determine the logging profile for the debug session. In this case, the client application (or alternatively, another component of the software platform) can automatically generate an appropriate logging profile for the debug session based on factors such as the current application status and/or the operational context of the user. The operational context of the user can refer to, for example, the current environment of the user, the current workflow of the user, the current system state of the user, the application context of the user, the current view or perspective of the user, the current interaction scope of the user, etc.

In response to the initiation of the debug session, a unique identifier is generated for the debug session, referred to herein as the debug session identifier, which is displayed to the user via the UI. The debug session identifier can be a text string (e.g., a string of alphanumeric characters). In addition, the debug session configuration is forwarded to the server.

While the debug session is active, the user attempts to reproduce the issue which had initially prompted them to initiate the debug session. Meanwhile, server requests are issued from the client application to the server, and the server determines whether each server request is part of the debug session. When a given backend component receives a server request that is part of the debug session, the log level of the given backend component is adjusted for the server request such that the given backend component generates log entries for the server request at the log level specified in the logging profile of the debug session configuration for the given backend component. For example, depending on the log level specified in the debug session configuration for the given backend component, the log level may be adjusted from a lower current log level (e.g., an error log level, a warning log level, or an info log level) to a higher log level such as a debug log level. For instance, the current log level may be a default log level, which may in turn be the error log level.

In contrast, when a given backend component receives a server request that is not part of the debug session, the given backend component performs logging for the server request in accordance with the current log level for the backend component (typically a lower log level than a debug log level, such as an error log level, a warning log level, or an info log level). Accordingly, as parallel requests received by backend components during a debug session which do not originate from the debug session are not run with debug log levels, an acceptable amount of log output is generated during the debug session. This can help to ensure that desired performance is not compromised by excessive log generation.

The debug session identifier is inserted in log entries generated by backend components for server requests that are part of the debug session. This serves to correlate the log entries with the debug session. After the user has finished reproducing the issue, or after a predefined timeout period has elapsed, the debug session is terminated. The debug session identifier can then be handed over to customer support and development teams. After receiving the debug session identifier, a developer can access log files and identify log entries therein that include the debug session identifier. Accordingly, the developer can focus on analyzing the issue that prompted the debug session without the need for additional data exports or customer communication.

Further, if the developer identifies that the issue was likely caused by another development team, the debug session identifier and initial investigation results can easily be handed over to the identified development team. Upon receipt of the debug session identifier and initial investigation results, the identified development team can begin to investigate the issue immediately (e.g., without waiting for time-consuming data import and environment setup).

Accordingly, the techniques described herein can reduce the amount of effort required for customer support and development teams to reproduce an issue experienced by a user. Sometimes, support users on the systems do not have proper privileges, and multiple iterations are required until the correct privileges are granted. By providing a framework in which the user can reproduce the issue in their native environment, the issue can be reproduced much more quickly relative to prior techniques.

Example 2—Example System Implementing Debug Sessions with Dynamic Log Level Adjustment FIG. 1 is a block diagram of an example system 100 implementing debug sessions with dynamic log level adjustment. In some examples, system 100 is a software platform such as a cloud-based analytics software platform. The system 100 includes a server 102 and a client system 104, among other components. Server 102 may be a data server which is part of a backend system within the software platform, or another type of server.

The server 102 includes a plurality of backend components. In the depicted example, the backend components include a router 106. The router 106 is configured to receive server requests sent from client system 104 via a Hypertext Transfer Protocol Secure (HTTPS) interface 108 and route the server requests to other backend components of the server 102. As shown, the other backend components can include one or more application servers 110, one or more services 112, and one or more databases 114. A given one of the services 112 may be a service or a microservice. The databases 114 may store datasets associated with a tenant of the software platform, for example.

In the example, the server 102 also includes a logger 116 configured to generate log entries for actions performed by the backend components (e.g., in response to server requests received from the client system 104). In other examples, one or more of the backend components may generate their own log entries. In either case, the log entries may be stored in various locations. For example, the backend components may store their logs individually in their respective environments. Alternatively, the backend components may send the generated logs to a dedicated logging service that provides a centralized storage location for logs, such as a central log storage 118. In the example, the central log storage 118 is external to server 102 and may be implemented by a third party service such as Grafana Cloud Logs available from Grafana Labs of New York City, United States. Alternatively, the central log storage 118 may be part of server 102 or implemented in another manner.

In examples where the backend components generate their own log entries and the server 102 does not include the logger 116, log entries generated by a given one of the databases 114 may be stored at the given one of the databases 114 and later extracted and written to the central log storage 118. In contrast, in such examples, log entries generated by other backend components such as the application servers 110 and/or the services 112 may be written directly to the central log storage 118.

Client system 104 can be configured to execute a client application 120 of the software platform. In some examples, the client application 120 generates and displays different data visualizations, reports, analytics, etc. In such examples, the client system 104 may execute client application 120 to access, change, and otherwise use data in the databases 114 of server 102. In other examples, however, the client application 120 may be a different type of client application which provides other functionality. Client system 104 can include any suitable computing device capable of executing client application 120 (e.g., a desktop computer, a laptop computer, a tablet computer, or a smartphone).

As shown, the client application 120 includes a debug session frontend component 122, which is alternatively referred to herein simply as a frontend component for the sake of brevity. The frontend component 122 can provide means for a user to initiate a debug session. Towards this end, the frontend component 122 may render specific parts of a UI 124 which are associated with the debug session (e.g., UI elements for initiating, configuring, and terminating a debug session as well as UI elements displaying status information for an active debug session). The frontend component 122 may also include logic for responding to user actions received via the elements of UI 124 associated with the debug session such as clicks, input, or scrolling. Further, the frontend component 122 may be configured to send data to and receive data from other components of the client application 120 and/or the server 102 and process received data for display via the UI 124.

When a user of the client system 104 has encountered an issue and wishes to initiate a debug session, the user can do so via appropriate input to the UI 124 (e.g., by activating an element of the UI 124 rendered by the frontend component 122). In some examples, this input may prompt the frontend component 122 to render additional UI elements for display via the UI 124 in order to gather configuration data for the debug session from the user. In such examples, the frontend component 122 may optionally cause a pop-up window to be displayed via the UI 124 for gathering the configuration data for the debug session.

In other examples, however, some or all the configuration data for the debug session may be generated by the client application 120. For example, after the user has initiated the debug session via the UI 124, the client application 120 (e.g., the frontend component 122) may determine appropriate configuration data for the debug session based on information such as the current state of the client application 120 and/or the operational context of the user, as discussed further below.

The configuration data can include a logging profile comprising respective log levels for one or more of the backend components of server 102 for the debug session. In examples where the configuration data is input by the user, the user can activate or otherwise manipulate UI elements to select or specify respective log levels for one or more of the backend components of server 102 for the debug session (e.g., a log level for the router 106, respective log levels for application servers 110, respective log levels for services 112, and respective log levels for databases 114). Optionally, the logging profile can also include respective log levels for other components such as the UI 124. In some examples, the log levels included in the logging profile may be selected from among an error log level, a warning log level, an info log level, and a debug log level. As described further below, other types of log levels may alternatively be selected, such as custom log levels or low, medium, and high log levels.

Alternatively, in examples where the client application 120 generates the configuration data, the client application 120 may determine appropriate log levels for the debug session based on the current state of the client application 120 and/or the operational context of the user. For example, if the user is in a view associated with a given component, the client application 120 can determine that log levels for the given component should be increased along with log levels of another component that is internally used during the current state. The configuration data for a debug session can also include other information such as an indication of whether the user consents to certain types of information being logged and stored (e.g., personal or confidential information) during the debug session. For example, the user may input such an indication via the UI 124, or the client application 120 may determine an appropriate indication without user input based on whether the user has previously consented to logging and storage of such information (e.g., by querying a database storing user information).

Optionally, the user can enable debug sessions for scheduled operations. For example, the configuration data input by the user can specify that a debug session should be performed during a next instance of a scheduled operation for which a debug session should be performed. The client application 120 may then wait to take further action until it is time for the next instance of the scheduled operation. For example, the client application 120 may refrain from modifying server requests from the user to include an indication that the server requests are part of the debug session until the start time of the next instance of the scheduled operation.

After the configuration data has been received (e.g., input or selected) via the UI 124, a request to initiate the debug session which includes the configuration data is transmitted from the UI 124 to the client application 120. Alternatively, in examples where the client application 120 generates some or all of the configuration data, the user may transmit a request to initiate the debug session to the client application 120 which includes no configuration data or partial configuration data, and the client application 120 generates the necessary configuration data for the debug session.

Next, a unique debug session identifier is generated for the debug session. As described further herein with respect to the example first and second embodiments, the debug session identifier may be generated by the frontend component 122 or by a backend component of the server 102 such as a debug session service **112*a***. The debug session identifier can be a string of characters that uniquely identifies the debug session (e.g., a string of alphanumeric characters).

The frontend component 122 of the client application 120 then generates a debug session configuration for the debug session. The debug session configuration includes the configuration data along with an indication that the debug session is active (e.g., a debug session flag which is set). As described further herein, the debug session configuration may also include the debug session identifier and/or an indication of a user associated with the debug session. The client application 120 then sends the debug session configuration to the server 102.

In examples where the configuration data specifies that the debug session should be performed during a next instance of a scheduled operation, the client application 120 may wait to send the debug session configuration to the server 102 until the start time of the next instance of the scheduled operation (or, until a predefined time period before the start time). Alternatively, the debug session configuration may be sent to the server 102 without a delay; in this case, the server 102 can determine whether a given server request is part of the next instance of the scheduled operation, and thus part of the debug session, based on contents of the given server request (e.g., based on whether the given server request comprises the debug session identifier or a debug session flag).

After the server 102 receives the debug session configuration, the router 106 forwards the debug session configuration to one or more other backend components of the server 102. In examples where the server 102 includes the debug session service 112*a*, such as the second embodiment described below, the debug session configuration is forwarded to the debug session service 112*a* (e.g., before the debug session service 112*a* generates the debug session identifier). The debug session service 112*a* may be configured to facilitate handling of debug sessions by the server 102. For example, the debug session service 112*a* may store information related to active debug sessions (e.g., debug session configurations including respective logging profiles for each active debug session, debug session identifiers, lists of users associated with active debug sessions, etc.).

In examples where the logger 116 performs logging for one or more of the backend components, the debug session configuration may also be forwarded to the logger 116. Alternatively or additionally, the debug session configuration or portions thereof may be forwarded by the router 106 or the debug session service 112*a* to one or more other backend components (e.g., to backend components which generate their own log entries). Accordingly, the respective log levels for the backend components specified in the logging profile of the debug session configuration are made available to the backend component(s) which perform logging, such that the respective log levels are adjusted appropriately for server requests that are part of the debug session.

After the debug session has been initiated, the user attempts to reproduce the issue (e.g., by initiating actions via UI 124), which triggers generation of corresponding server requests at the client application 120. The server requests can be embodied by data structures such as software objects (e.g., JavaScript Object Notation (JSON) objects). In some examples, while the debug session is active, the frontend component 122 modifies each server request to include an indication that the server request is part of the debug session. After receiving a given server request, the server 102 can determine whether it includes an indication that it is part of the debug session, and if so, adjust log levels of one or more backend components in accordance with the debug session configuration.

Modifying a given server request to include an indication that the server request is part of the debug session can include, for example, inserting the debug session identifier in the server request or setting a debug session flag in the server request (e.g., in the header of the server request, the body of the server request, or as a query string parameter). The debug session flag being set may serve as an indicator that request-based debugging is enabled for the server request.

Optionally, each server request may also include a correlation identifier which is distinct from the debug session identifier (e.g., in the header). The correlation identifier may be a unique identifier for the server request. In this case, a given server request that is part of a debug session may include both a correlation identifier which is unique to the given server request and debug session identifier which is unique to server requests that are part of the debug session.

In other examples (e.g., the second embodiment described herein), the server requests may already include an indication that they are part of the debug session such that modification of the respective server requests to include such an indication is not necessary. For example, a given server request may include an indication of a user associated with the server request (e.g., a cookie), and the debug session configuration may include an indication of a user associated with the debug session. After receiving the given server request, the server 102 (e.g., the debug session service 112*a*) can determine whether the indicated user matches the user associated with the debug session, and if so, adjust log levels of one or more backend components in accordance with the debug session configuration.

As the server requests that are part of the debug session are processed, corresponding log entries are generated at the respective log levels specified in the logging profile (e.g., by the logger 116 or by the individual backend components involved in processing the server requests). The debug session identifier is inserted in each log entry associated with a server request that is part of the debug session. Meanwhile, the server 102 may also process server requests that are not part of the debug session. The debug session identifier is not inserted in log entries associated with server requests that are not part of the debug session.

In examples where the backend components generate their own log entries and the server 102 does not include the logger 116, log entries generated by the various backend components may be written directly to the central log storage 118. Alternatively, log entries generated by the application servers 110 and/or the services 112 may be written directly to the central log storage 118, whereas log entries generated by a given one of the databases 114 may be stored at the given one of the databases 114 and later extracted and written to the central log storage 118. In either case, gathering log entries which were collected in a decentralized manner at the different backend components and storing the log entries in the central log storage 118 achieves several advantages. For example, because the log entries for a given debug session are correlated with the debug session identifier, the log entries relevant to the given debug session can be easily retrieved from the central log storage 118. The retrieved log entries for the debug session can then be displayed to personnel associated with the software platform (e.g., customer support, cloud operations personnel, and/or developers) as "request context" for the debug session. As a result, centralizing the information collection can dramatically reduce time-to-repair (e.g., from multiple weeks to a few hours). Further, this may also allow personnel associated with the software platform to proactively identify issues that customers have not yet raised and potentially, the application context of such issues (e.g., the user triggered a data action in the debug session).

As another example, log entries that include the debug session identifier can optionally be stored together in a file. In particular, only log entries that include the debug session identifier are stored in the file; other log entries that do not include the debug session identifier are not stored in the file. The file can then be encrypted and subsequently output in response to a request for log entries for the debug session (e.g., a server request received at the server 102 from a developer who has access to a decryption key which can be used to decrypt the file).

When the user has finished attempting to reproduce the issue, the user may actively terminate the debug session (e.g., by activating an element of the UI 124). Alternatively or additionally, the client application 120 may be configured to terminate the debug session after a predetermined timeout period has elapsed since the start of the debug session (e.g., 5 minutes, 10 minutes, or another duration). In some examples, the duration of the timeout period may be specified by the user prior to the debug session (e.g., as part of the configuration data received via the UI 124). Optionally, the UI 124 may include an element which allows the user to refresh the debug session prior to expiration of the timeout period (e.g., to restart the timeout period to allow more time for the debug session). In such examples, the time remaining in the timeout period may be displayed via the UI 124 (e.g., as part of a debug session banner, in a notification pop-up window comprising a UI element which can be activated to restart the timeout period, or in another manner).

After the debug session has ended, the user can provide the debug session identifier to customer support and development teams. For example, the user may share the debug session identifier with one or more customer support systems 125, which in turn may share the debug session identifier with one or more developer systems 126. Alternatively, the debug session identifier may be provided to the customer support system(s) 125 and/or developer system(s) 126 by the server 102 without user intervention.

As shown, the developer system(s) 126 can access the debug logs of backend components of the server 102 by sending a request to the server 102. Because the log entries associated with the debug session include the debug session identifier, the logs can be easily filtered (e.g., by support users or developers) to the log entries relevant to the debug session using the debug session identifier. This in turn can facilitate and expedite resolution of the issue.

The system 100 can also comprise one or more non-transitory computer-readable media having stored therein computer-executable instructions that, when executed by the computing system, cause the computing system to perform any of the methods described herein.

In practice, the systems shown herein, such as system 100, can vary in complexity, with additional functionality, more complex components, and the like. Additional components can be included to implement security, redundancy, load balancing, report design, and the like.

The described systems can be networked via wired or wireless network connections, including the Internet. For example, the system 100 can be implemented in a cloud environment, as detailed below with reference to FIG. 8. Alternatively, the systems can be connected through an intranet connection (e.g., in a corporate environment, government environment, or the like).

The system 100 and any of the other systems described herein can be implemented in conjunction with any of the hardware components described herein, such as the computing systems described below (e.g., processing units, memory, and the like). In any of the examples herein, the debug session configuration, the server requests, and the like can be stored in one or more computer-readable storage media or computer-readable storage devices. The technologies described herein can be generic to the specifics of operating systems or hardware and can be applied in any variety of environments to take advantage of the described features.

Example 3—Example Log Levels

Logging of server actions in a software platform may be performed at predefined levels referred to as error, warning, info, and debug log levels. The different log levels provide control of the granularity of logging and the type of information that is logged.

In accordance with the techniques described herein, the log levels for a given server request can be dynamically adjusted based on whether the given server request is part of an active debug session. Similarly, the log levels specified in a logging profile for a debug session can be dynamically adjusted by a user such that the user can control the respective log levels of individual components or component types.

As used herein, adjusting the log level of a given backend component can include adjusting the log level type for the given backend component. That being said, because different log level types tend to generate different logging frequencies, adjusting the log level type of a given backend component can also be understood as adjusting the logging frequency, and similarly, adjusting the quantity of log entries/adjusting the size of the logs for the given backend component. To better explain this nuance, a description of the error, warning, info, and debug log levels is provided in Table 1 below.

TABLE 1

Log Level Descriptions

| Log Level Name | Description |
|---|---|
| Error (e) | At the error log level, log entries are generated when problems occur which require immediate attention and must be addressed promptly to ensure the application continues to work as expected. This log level is typically lower than the warning, info, and debug log levels. |
| Warning (w) | At the warning log level, log entries are generated when unexpected behavior occurs within an application but key features are still operating as expected. These log entries indicate potential issues that |

TABLE 1-continued

Log Level Descriptions

| Log Level Name | Description |
| --- | --- |
| | do not cause immediate problems but might lead to more serious issues if left unaddressed. Error log entries are also generated at the warning log level. |
| Info (i) | At the info log level, log entries are generated to describe the control flow and thus capture routine operational information about the application (e.g., services starting or stopping and resources being added, deleted, or modified). These log entries typically provide insights into the application's state and behavior under normal circumstances. Error log entries and warning log entries are also generated at the info log level. |
| Debug (d) | At the debug log level, log entries are generated to provide more detailed information (e.g., the results of queries) for use during software debugging and troubleshooting. This log level provides in-depth details about the application's internal state, variable values, and execution flow. Typically, debug log levels are not enabled in production environments due to their volume and potential performance impact. Error log entries, warning log entries, and info log entries are also generated at the debug log level. |

As indicated in Table 1, at the debug log level, info log entries, warning log entries, and error log entries are generated in addition to debug log entries. Accordingly, the debug log level typically results in generation of the most log entries (and thus, the most detailed logs). At the info log level, warning log entries and error log entries are generated in addition to info log entries, but debug log entries are not generated. Accordingly, the info log level typically results in generation of fewer log entries than the debug log level, but more log entries than the warning or error log levels. At the warning log level, error log entries are generated in addition to warning log entries, but debug and info log entries are not generated. Accordingly, the warning log level typically results in generation of fewer log entries than the debug and info log levels, but more log entries error log levels. At the error log level, only error log entries are generated. Accordingly, the error log level typically results in generation of fewer log entries than the debug, info, and warning log levels.

In some examples, the log levels for a debug session may be characterized differently when presented to the user for selection. For example, the UI 124 may include means for the user to select between predefined log levels such as low, medium, and high log levels (either globally, for all backend components of the server 102, or individually for one or more backend components). Predefined log levels such as the low, medium, and high log levels may be used to facilitate user understanding, as the user may be unfamiliar with the meaning of the debug, info, warning, and error log levels. The low, medium, and high log levels (and other predefined log levels) may be predefined on the server 102 with respect to the debug, info, warning, and error log levels. For example, the low log level may only generate error log entries or only error and warning log entries; the medium log level may only generate info, warning, and error log entries; the high log level may generate debug log entries as well as info, warning, and error log entries.

Alternatively or additionally, the UI 124 may include means for the user to select from among one or more custom log levels. A given custom log level may be associated with respective individual log levels for one or more backend components, or for one or more types of backend components. For example, in some circumstances, it may be desirable to obtain detailed logs from services whereas fewer logs are need from databases. In this case, a custom log level may be selected which specifies the debug log level for services and the warning log level for databases.

As another example, respective custom log levels may be provided for different workflows. For example, a custom log level for data actions may specify higher log levels for backend components associated with data actions (e.g., the application server and databases) but lower log levels for other backend components (e.g., the services).

While log levels for backend components of the server 102 are often discussed herein, log levels of frontend components of the client application 120 (e.g., the UI 124) can also be dynamically adjusted via the techniques described herein.

Further, while user adjustment of log levels via the UI 124 is discussed above, the log levels for a debug session can alternatively be adjusted by the software platform without user input. For example, the client application 120 may determine appropriate log levels for a debug session based on a current state of the client application 120 and/or an operational context of the user, among other factors. Such operation can advantageously simplify the process for the user and help to ensure that the most appropriate log levels are selected for a given debug session.

Furthermore, other approaches for configuring the logging profile for a debug session are contemplated. For example, the UI 124 can display a chat window which allows a user to participate in a chat session with personnel of the software platform and/or with a generative artificial intelligence (AI) chatbot trained to identify appropriate log levels for various issues or situations. The user can then input information regarding the issue they have encountered and receive a response indicating which log level(s) the user should select for the debug session via the UI 124. Alternatively, the client application 120 can automatically generate the configuration data (e.g., the logging profile) based on the information input by the user.

Example 4—Example First Embodiment

In an example first embodiment, after receiving a request to initiate a debug session, the frontend component 122 of the client application 120 generates the debug session identifier for the debug session. In this embodiment, the debug session identifier may be included in the debug session configuration which the client application 120 sends to the server 102. The router 106 then forwards the debug session configuration, which includes the debug session identifier, to the logger 116 (or alternatively, to the respective backend components in examples where the backend components perform their own logging).

Figure 2:
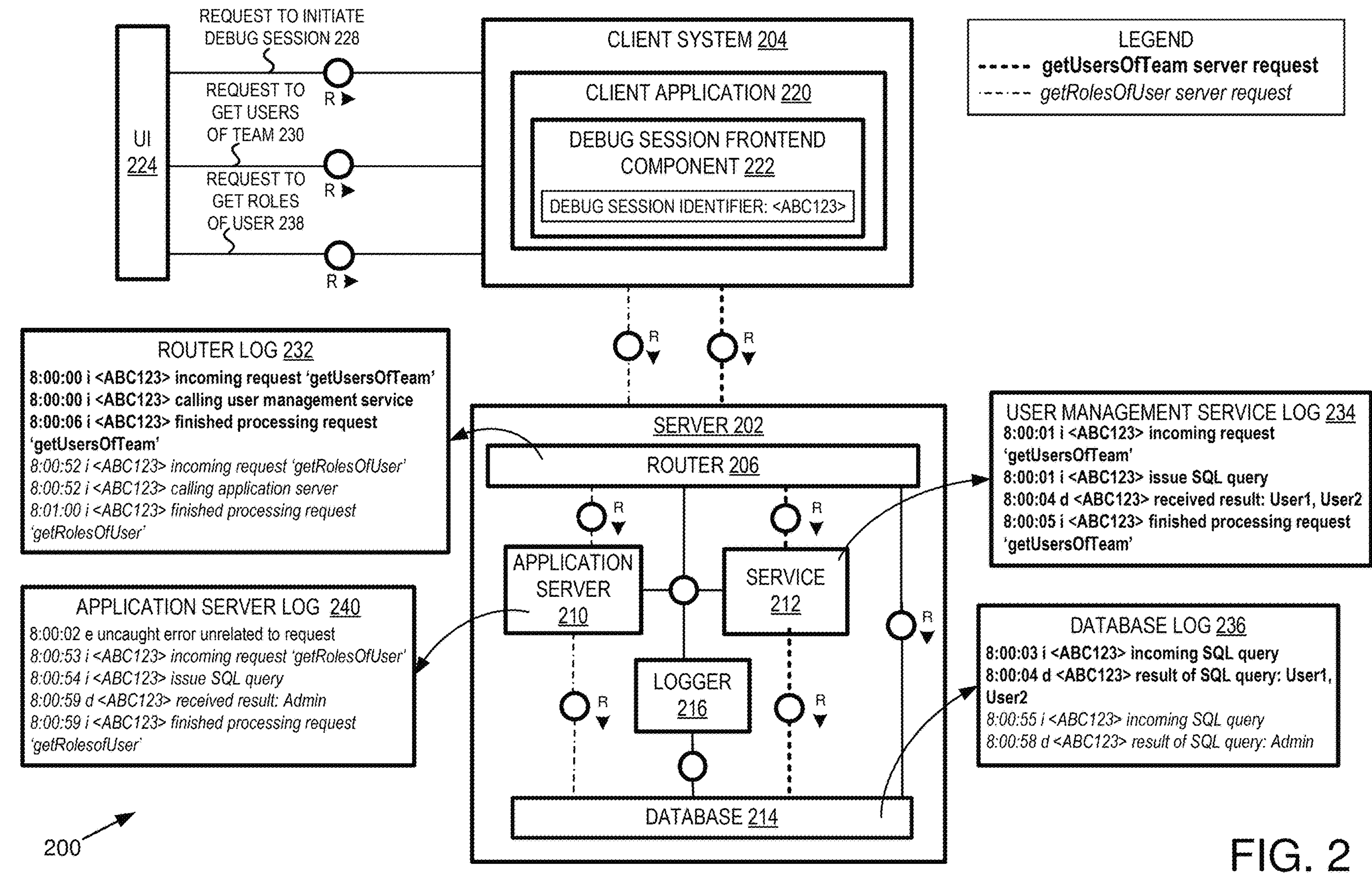
FIG. 2 is a block diagram of the example system of FIG. 1 performing dynamic log level adjustment during an example debug session.

FIG. 2 is a block diagram of a detail view 200 of system 100 of FIG. 1 in accordance with the first embodiment. The components shown in FIG. 2 are numbered consistently with FIG. 1, except where new or modified elements are introduced. Accordingly, the description of like-numbered elements for FIG. 1 can also be applied to FIG. 2. In particular, detail view 200 depicts a control flow and associated logs generated during an example debug session in accordance with the first embodiment. For case of explanation, a single application server 210, service 212, and database 214 are shown in FIG. 2; in practice, there may be multiple of one or more of these components, as shown in FIG. 1.

In the example, a user sends a request to initiate a debug session to a client system 204 at 228 via a UI 224. The request optionally includes configuration data for the debug session, which may in turn specify a logging profile for the debug session. The logging profile can include respective log levels for one or more backend components for actions associated with server requests that are part of the debug session. In the example, the debug log level is specified for the router 206, the application server 210, the service 212, and the database 214. Alternatively, as discussed above, the configuration data may be generated be the client application 220.

After receiving the request, a debug session frontend component 222 of a client application 220 generates a debug session identifier (ABC123 in the example) for the debug session. As described herein, the debug session identifier may be displayed to the user via the UI 224. In addition, the frontend component 222 sends a debug session configuration for the debug session to a server 202. In this example, the debug session configuration includes the configuration data for the debug session, the debug session identifier (ABC123), and an indication that the debug session is active.

A router 206 of the server 202 may forward the debug session configuration to a logger 216, and/or to one or more other backend components of the server 202 (e.g., to backend components which generate their own log entries). In the example, the backend components (e.g., the router 206, application server 210, service 212, and database 214) are configured to generate logs at a default log level which is the error log level. During the debug session, the backend components and/or the logger 216 will continue to generate logs at the error log levels debug session configuration for server requests which are not part of the debug session. However, in accordance with the debug session configuration, the log levels for the backend components will be adjusted to the debug log level for server requests that are part of the debug session (i.e., server requests that include the debug session identifier in this example).

The user then attempts to reproduce an issue they had experienced while requesting a list of users that are part of a team and querying the roles of one of the users. Accordingly, at 230, the user sends a request via the UI 224 for a list of users that are part of a certain team to the client system 204. The frontend component 222 generates a corresponding getUsersOfTeam server request and inserts the debug session identifier in the getUsersOfTeam server request (e.g., in the header). As shown, the getUsersOfTeam server request is then sent to the server 202 and delegated by the router 206 to the service 212. In the example, the service 212 is a user management service.

The user management service requests the list of users of the team from the database 214, which in turn returns the list of users (User1, User2) to the user management service. The user management service returns the list of users to the router 206, which in turn returns the list of users to the client application 220. The client application can then display the list of users via the UI 224.

Meanwhile, during the processing of the getUsersOfTeam server request, corresponding log entries are generated in a router log 232, a user management service log 234, and a database log 236 at the debug log level. For ease of depiction, the log entries associated with the getUsersOfTeam server request are shown in bold. As shown, a given log entry generated during the processing of the getUsersOfTeam server request includes a time stamp, a letter indicating the log type, the debug session identifier (ABC123), and a description. The time stamps of the log entries reflect the order in which the server request flows through the affected components. In the example, because the debug session configuration specified the debug log level for the backend components, the processing of the getUsersOfTeam server request resulted in generation of info ("i") and debug ("d") type log entries at the router log 232, user management service log 234, and database log 236. (Warning and error type log entries could have also been generated at the debug log level, but are not shown in the example.)

Optionally, the log entries for a given server request may also include a unique correlation identifier for the given server request in addition to the debug session identifier. This can allow log entries for different server requests of the debug session may be distinguished from one another.

Next, at 238, the user sends a request via the UI 224 to query the roles of one of the users. The frontend component 222 then generates a corresponding getRolesOfUser server request and inserts the debug session identifier in the getRolesOfUser server request. As shown, the getRolesOfUser server request is then sent to the server 202 and delegated by the router 206 to the application server 210. The application server 210 requests the roles of the user from the database 214, which in turn returns the roles of the user (Admin) to the application server 210. The application server 210 returns the roles of the user to the router 206, which in turn returns the roles of the user to the client application 220. The client application can then display the roles of the user via the UI 224.

Meanwhile, during the processing of the getRolesOfUser server request, corresponding log entries are generated in the router log 232, the database log 236, and an application server log 240 at the debug log level. For ease of depiction, the log entries associated with the getRolesOfUser server request are italicized. In the example, because the debug session configuration specified the debug log level for the backend components, the processing of the getRolesOfUser server request resulted in generation of info ("i") and debug ("d") type log entries at the router log 232, database log 236, and application server log 240.

The logs for the backend components can also include entries for other unrelated concurrent server requests (i.e., server requests which are not part of the debug session). For instance, the application server log 240 contains an error ("e") type log entry from server request initiated by another user (i.e., a server request that is not part of the debug session and does not include the debug session identifier). Because this unrelated server request is not part of the debug session, log entries for the server request are generated at the default error log level (and thus, debug, info, and warning type log entries are not generated for the server request).

Example 5—Example Second Embodiment

In an example second embodiment which may be implemented in system 100 of FIG. 1, the debug session configuration generated by the frontend component 122 further includes an indication of a user associated with the debug session (e.g., in addition to the indication that a debug session is active and the logging profile for the debug session). In this embodiment, the frontend component 122 does not generate the debug session identifier; instead, the frontend component 122 sends the debug session configuration to the server 102, and a debug session service 112*a* of the server 102 generates the debug session identifier. The debug session service 112*a* then transmits the debug session identifier to the client application 120 for display via the UI 124. The debug session service 112*a* also sends the debug session identifier to the logger 116 (or alternatively, to the respective backend components in examples where the backend components perform their own logging).

After receiving the debug session configuration, the server 102 stores the indication that the user is associated with the debug session. For example, storing the indication that the user is associated with the debug session can include setting a flag associated with the user which indicates that the user is now debugging their session (e.g., in a database 114, at the debug session service 112*a*, or at another location).

After the debug session has been initiated, the user attempts to reproduce the issue, which triggers generation of corresponding server requests at the client application 120. In this embodiment, a given server request may already include, by default, an indication of a user associated with the server request (e.g., a cookie). In this case, modification of the respective server requests to include such an indication is not necessary.

After receiving a given server request, the server 102 can determine whether the indicated user associated with the given server request matches the user associated with the debug session that was specified in the debug session configuration. For example, if a flag associated with the user specified in the debug session configuration is set in the database 114, the debug session service 112*a* can query the database 114 to determine whether a flag is set for the associated user indicated in the server request. If so, the debug session service 112*a* adjusts log levels of one or more backend components to the corresponding levels specified in the debug session configuration (for the given server request, as opposed to globally). For example, the debug session service 112*a* may send a signal to the logger 116, or to the respective backend components, to effect the log level adjustment for the given server request.

Accordingly, in the second embodiment, the server 102 stores an indication of whether a given user is associated with an active debug session. As such, it is not necessary to include the debug session identifier in a given server request to signify that the given server request is part of the debug session; instead, the associated user is already indicated in the server requests (e.g., by default) and can be checked to determine whether the server request is part of the debug session.

Figure 3A:
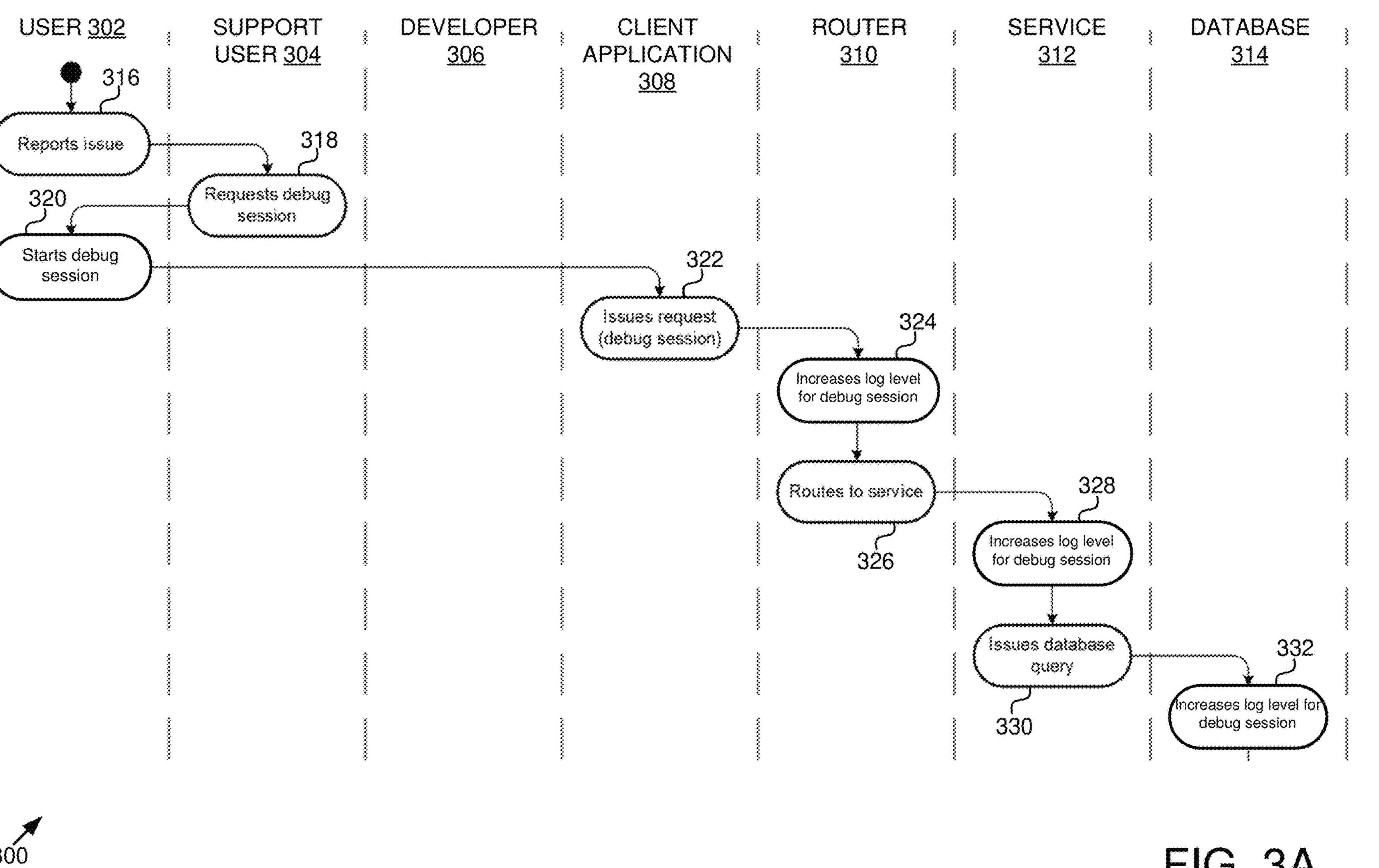
FIGS. 3A and 3B depict a flow diagram of dynamic log level adjustment during an example debug session.
Figure 3B:
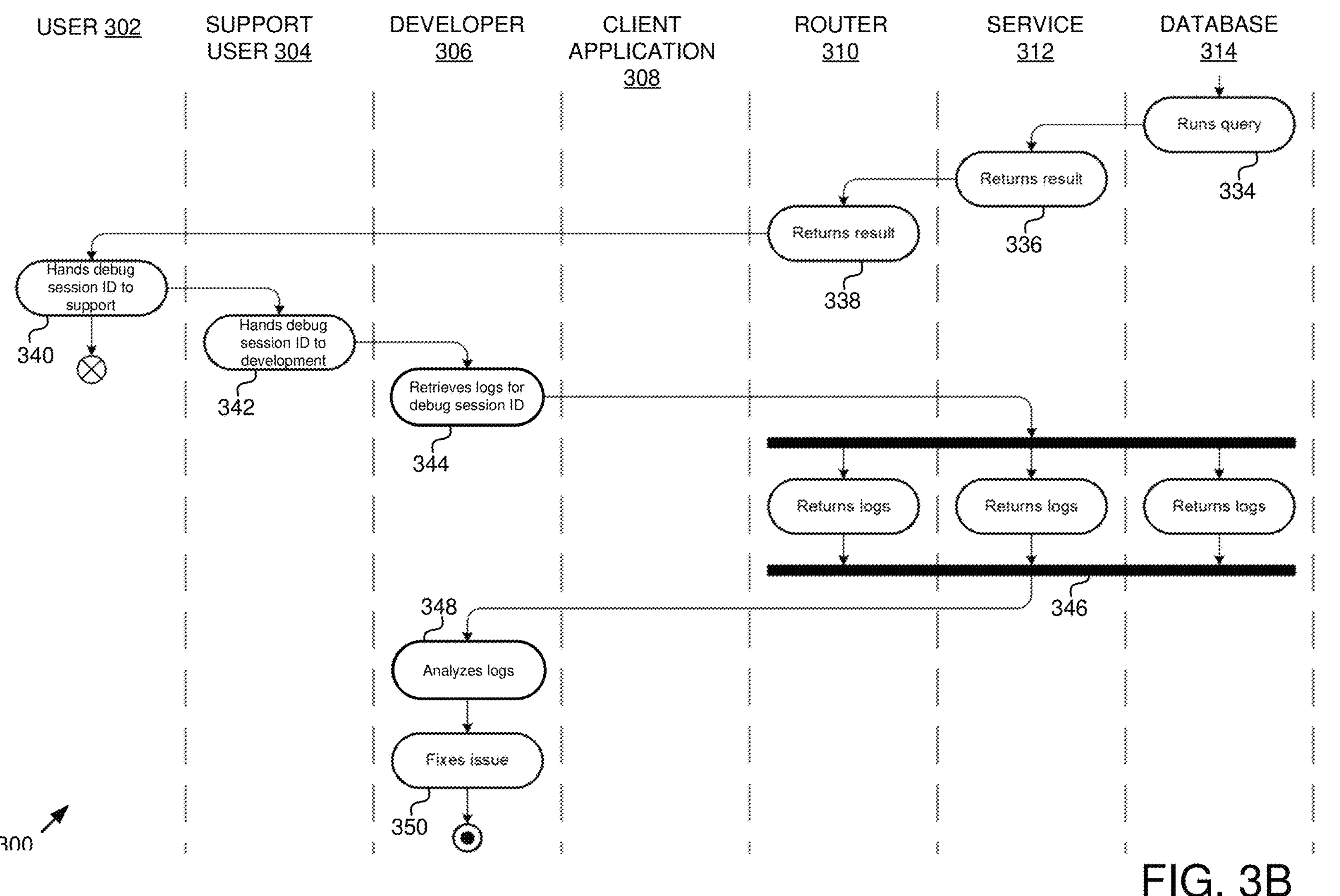

Example 6—Example Process for Resolving an Issue Via a Debug Session with Dynamic Log Level Adjustment FIGS. 3A-3B depict a flow diagram of an example process 300 for resolving an issue via a debug session with dynamic log level adjustment. Process 300 can be performed, for example, by the system of FIG. 1 (e.g., by a server such as server 102 of FIG. 1). For example, process 300 can be performed in accordance with the first embodiment or the second embodiment described herein. The actors involved in process 300 include a user 302, a support user 304, a developer 306, a client application 308 of a client system (e.g., client system 104 of FIG. 1), along with a router 310, a service 312, and a database 314 of a server (e.g., server 102 of FIG. 1). In the example, the router 310, the service 312, and the database 314 each have a default log level which is lower than the debug log level (e.g., an info, warning, or error log level). The default log levels may be the same, or one or more of the components may have different default log levels.

At 316, the user 302 reports an issue to the support user 304; in the example, the issue associated with a database query. In response, at 318, the support user 304 sends a request to the user 302 to conduct a debug session. After receiving the request, the user starts the debug session at 320. For example, as described herein, starting the debug session can include the user 302 sending a request to the client application 308 to initiate the debug session (not shown). The request can include configuration data for the debug session that is input by the user via a UI, including a logging profile for the debug session. In the example, the logging profile specifies that logging for the debug session should be performed at the debug log level by the router 310, service 312, and database 314.

In response to the request, the client application 308 either generates a debug session identifier for the debug session, or requests that the server generate and return the debug session identifier. In either case, the client application 308 transmits a debug session configuration to the server which includes the configuration data and indicates that the debug session is active. The debug session configuration can optionally include the debug session identifier (e.g., in accordance with the first embodiment), and/or an indication of a user associated with the debug session (e.g., in accordance with the second embodiment).

Next, the user begins attempting to reproduce the issue with the database query (e.g., by performing actions via the UI). These actions trigger the client application 308 to issue a server request to the router 310 at 322. In this example, the individual backend components perform their own logging. Accordingly, after receiving the server request, the router 310 determines that the server request is part of the debug session and increases its log level for the server request to the debug log level at 324. The router 310 then routes the server request to the service 312 at 326.

After receiving the server request from the router 310, the service 312 determines that the server request is part of the debug session and increases its log level for the server request to the debug log level at 328. At 330, the service 312 issues a database query to the database 314 in accordance with the server request.

After receiving the database query from the router 310, the database 314 determines that the database query is associated with a server request that is part of the debug session and increases its log level for the server request to the debug log level at 332. At 334, the database 314 runs the query and then returns the result to the service 312 at 336, which in turn returns the result to the router 310 at 338. At this stage, the user 302 is done reproducing the issue and terminates the debug session.

Next, the user 302 provides the debug session identifier for the debug session to the support user 304 at 340, and then the support user 304 provides the debug session identifier to the developer 306 at 342. After receiving the debug session identifier, the developer 306 sends a request to retrieve logs for the debug session (e.g., log entries which include the debug session identifier) to the server at 344. In the example, after receiving the request, the router 310, the service 312, and the database 314 return the requested logs to the developer 306 at 346. The developer 306 analyzes the logs at 348, and fixes the issue at 350.

Example 7—Example UI for Log Level Selection

Figure 4:
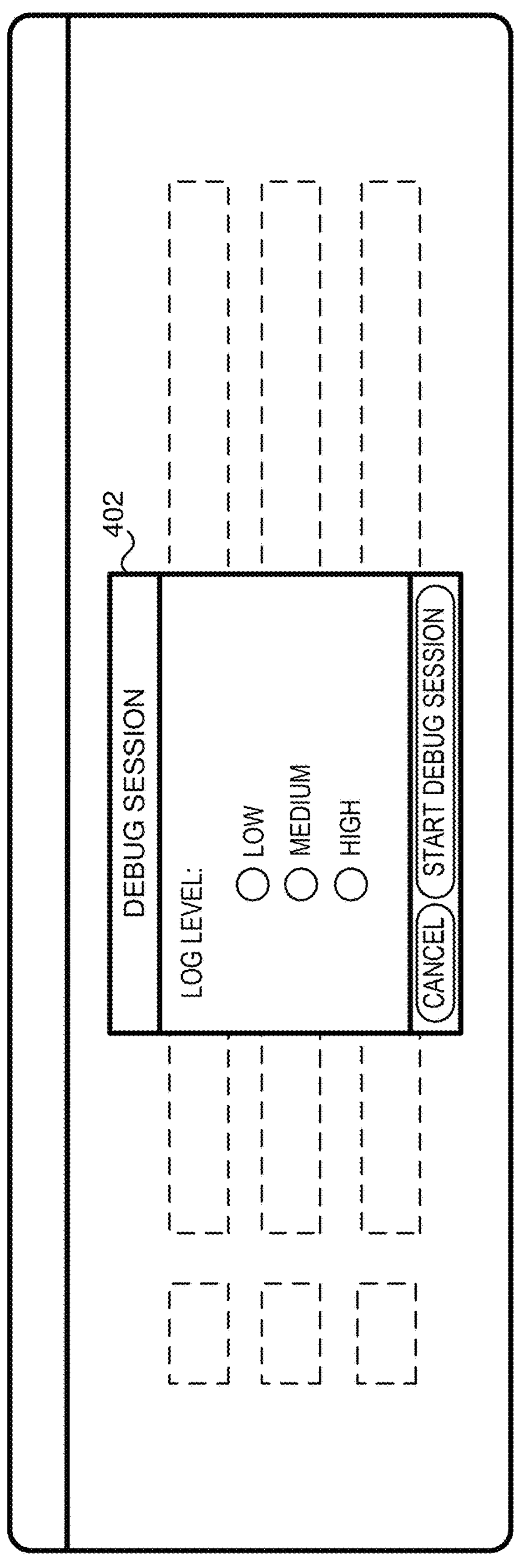
FIG. 4 is a block diagram of an example user interface for log level selection.
Figure 4:

FIG. 4 is a block diagram of an example UI 400 for log level selection. The log level selection may be performed by a user in the process of initiating a debug session. The UI 400 may be a UI of a client application comprising a debug session frontend component, such as UI 124 of FIG. 1.

While not shown in FIG. 4, the UI 400 may include an element which the user can activate (e.g., select or click on) to initiate the debug session, which in turn can trigger a process for gathering additional information regarding the debug session (referred to herein as configuration data). In the example, user activation of a UI element to initiate the debug session has spawned a pop-up window 402. The pop-up window 402 includes radio buttons which can be activated by the user to select from among a low, medium, and high log level for the debug session. The pop-up window 402 also includes UI elements which enable the user to either cancel the debug session or start the debug session.

As described above, the low, medium, and high log levels may each be associated with corresponding log levels from among the debug, info, warning, and error log levels. Abstracting the debug, info, warning, and error log levels in this way may facilitate user selection of the log level for the debug session, as the user may be unfamiliar with what these log levels entail. In some examples, a support user may recommend that the user to select a particular log level or log levels for the debug session.

In other examples, the pop-up window 402 may be configured to provide more granular log level selection. For example, the pop-up window 402 may optionally include means for the user to select respective log levels for individual backend components, or to select from among custom log levels or predefined log levels for different data workflows.

While the pop-up window 402 is shown for the sake of example, it will be appreciated that the logging profile and other configuration data can be gathered in various ways. For example, the configuration data can be gathered via user manipulation of additional UI elements such as drop down menus or text fields, via initiation of a dialog between the user and a chatbot that uses generative (AI) to conduct a conversation with the user, or in another manner. Alternatively, some or all of the configuration data may be generated by the software platform independent of user input (e.g., based on information such as a current state of the client application and/or an operational context of the user).

Example 8—Example UI with Debug Session Status Banner

Figure 5:
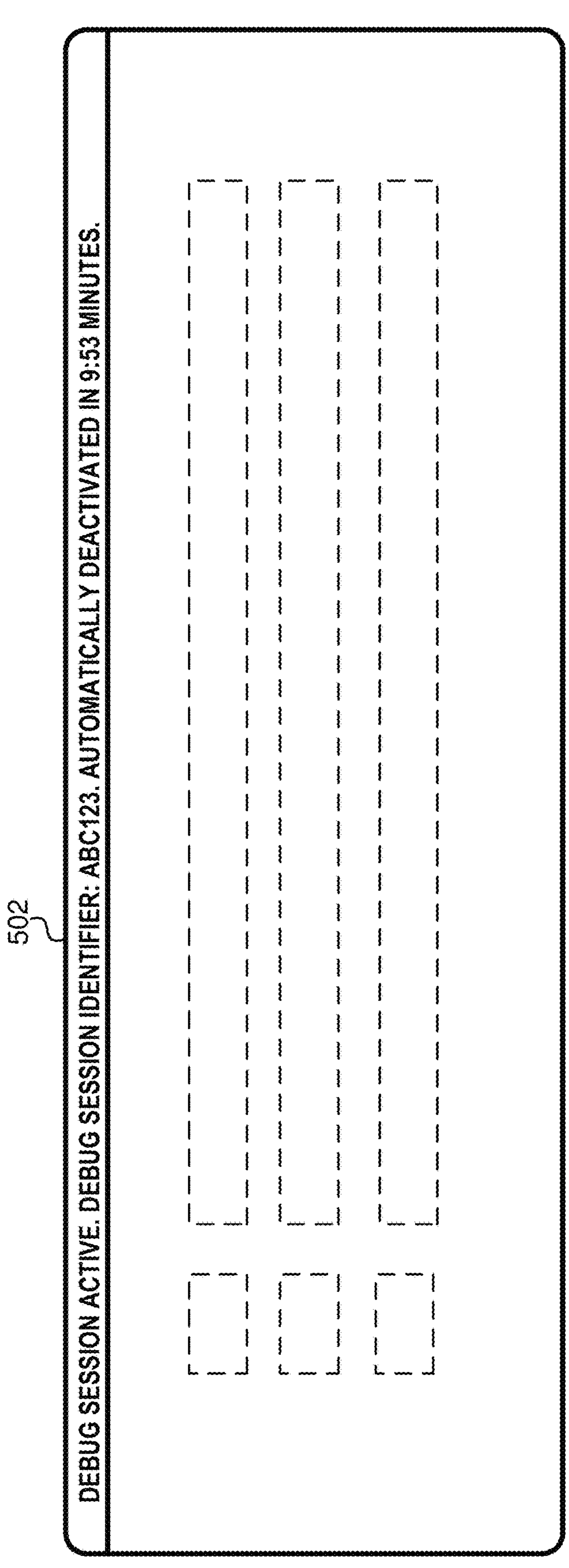
FIG. 5 is a block diagram of an example user interface displaying a debug session status banner during a debug session.

FIG. 5 is a block diagram of an example UI 500 displaying a debug session status banner. For example, UI 500 may be displayed during the debug session, after the user has input the configuration data for the debug session and started the debug session (e.g., by clicking on the "start debug session" button via UI 400 of FIG. 4 after selecting the log level).

In the example, during the debug session, a debug session status banner 502 is displayed via the UI 500 (e.g., as part of a menu bar at the top of a browser). The banner 502 displays information regarding the status of the active debug session including the debug session identifier, text indicating that the debug session is active, and an indication of how much time remains before the debug session will be automatically terminated due to timeout. Alternatively, different information, additional information, or less information may be included in the banner 502. Further, the debug session status may alternatively be displayed in a different manner than in a banner, and/or may be displayed at a different location within UI 500.

In some examples, the UI 500 may also include a button (not shown) which can be activated by the user to prolong the debug session (e.g., for 5 minutes or another duration), to avoid automatic termination of the debug session due to timeout.

Figure 6:
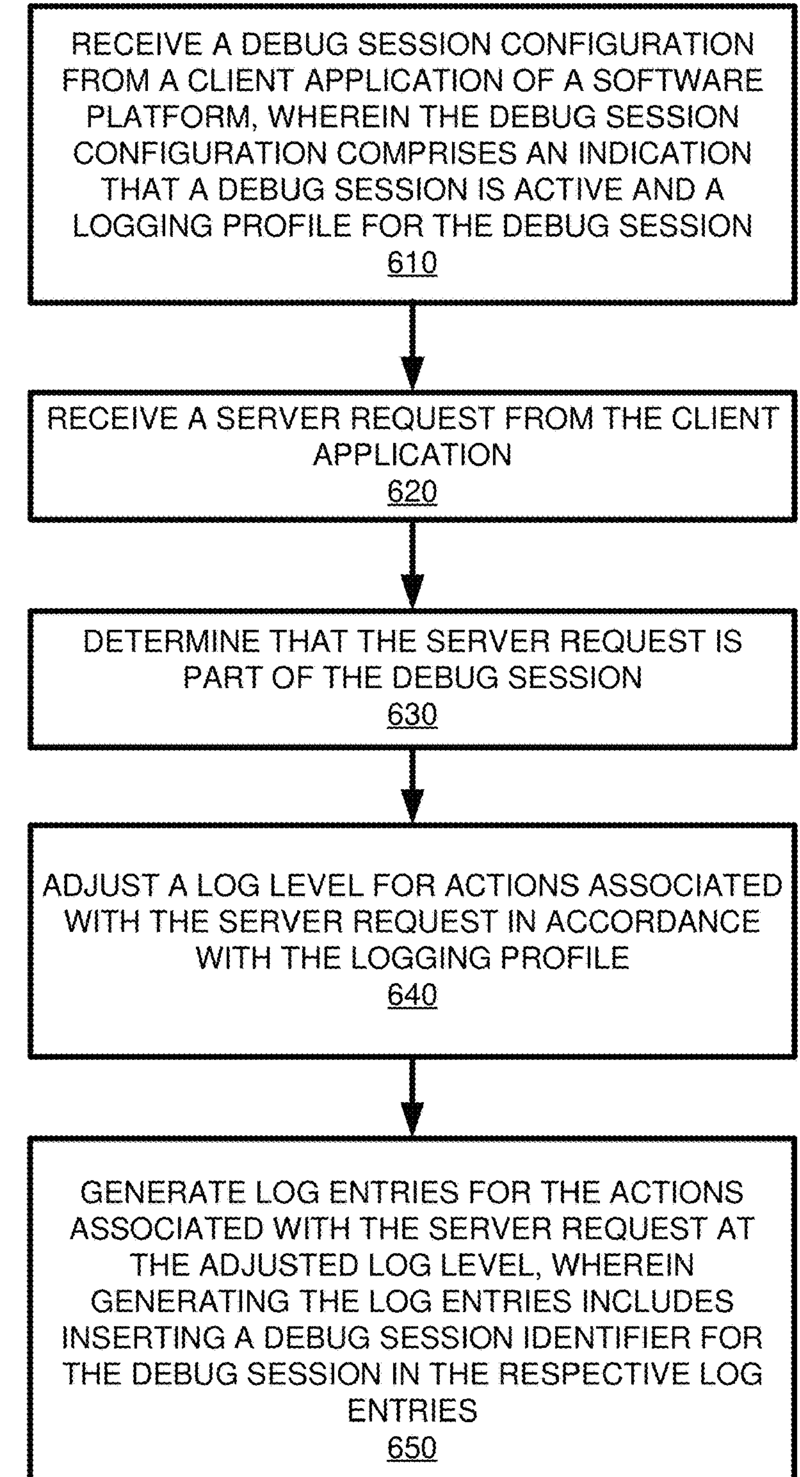
FIG. 6 is a flowchart of an example method of dynamically adjusting log levels for a debug session.

Example 9—Example Method of Dynamically Adjusting Log Levels for a Debug Session FIG. 6 is a flowchart of an example method 600 of dynamically adjusting log levels for debug sessions. Method 600 can be performed, for example, by the system of FIG. 1.

In the example, at 610, a debug session configuration is received from a client application of a software platform. The debug session configuration comprises an indication that a debug session is active and a logging profile for the debug session. The logging profile may specify respective log levels for one or more backend components of the software platform for actions associated with the debug session.

At 620, a server request is received from the client application. For example, the server request may be triggered by actions performed by a user via a UI as the user attempts to reproduce an issue they previously encountered while using the client application.

At 630, it is determined that the server request is part of the debug session. For example, a server of the software platform such as server 102 of FIG. 1 can determine that the server request is part of the debug session by checking whether the server request includes a debug session identifier associated with the debug session and/or a debug flag which is set. As another example, the server can make the determination by checking whether an associated user indicated in the server request matches an associated user in indicated in the debug session configuration.

At 640, a log level for actions associated with the server request is adjusted in accordance with the logging profile. For example, adjusting the log level in accordance with the logging profile may include modifying current log levels for one or more backend components to respective log levels specified in the logging profile for the one or more backend components.

At 650, log entries for the actions associated with the server request are generated at the adjusted log level. As described further herein, generating the log entries includes inserting a debug session identifier for the debug session in the respective log entries. Accordingly, after the debug session has concluded, a developer can filter the server logs by the debug session identifier in order to obtain a targeted set of log entries for use in analyzing the issue that prompted the debug session.

The method 600 and any of the other methods described herein can be performed by computer-executable instructions (e.g., causing a computing system to perform the method) stored in one or more computer-readable media (e.g., storage or other tangible media) or stored in one or more computer-readable storage devices. Such methods can be performed in software, firmware, hardware, or combinations thereof. Such methods can be performed at least in part by a computing system (e.g., one or more computing devices).

The illustrated actions can be described from alternative perspectives while still implementing the technologies. For example, receiving a request can be described as sending a request depending on perspective.

Example 10—Example Implementations

Any of the following can be implemented.

Clause 1. A computer-implemented method comprising: receiving a debug session configuration from a client application of a software platform, wherein the debug session configuration comprises an indication that a debug session is active and a logging profile for the debug session; receiving a server request from the client application; determining that the server request is part of the debug session; adjusting a log level for actions associated with the server request in accordance with the logging profile; and generating log entries for the actions associated with the server request at the adjusted log level, wherein generating the log entries includes inserting a debug session identifier in the respective log entries.

Clause 2. The method of Clause 1, wherein: the logging profile specifies respective log levels for one or more backend components of the software platform for actions associated with the debug session; and adjusting the log level for the actions associated with the server request in accordance with the logging profile comprises adjusting current respective log levels of the one or more backend components to the respective log levels specified the logging profile.

Clause 3. The method of Clause 2, wherein: the respective log levels for the one or more backend components specified in the logging profile are selected from the group consisting of an error log level, a warning log level, an info log level, a debug log level, and a custom log level; and the debug log level is a higher log level than the info log level, the warning log level, and the error log level.

Clause 4. The method of Clause 1 or Clause 2, wherein: the logging profile specifies a log level for one or more backend components of the software platform for actions associated with the debug session; and adjusting the log level for the actions associated with the server request in accordance with the logging profile comprises increasing a current log level of the one or more backend components for actions associated with the debug session to a higher log level.

Clause 5. The method of any one of Clauses 1-4, wherein the debug session identifier comprises a string of characters that uniquely identifies the debug session.

Clause 6. The method of any one of Clauses 1-5, further comprising: receiving one or more other server requests while the debug session is active; determining that the one or more other server requests are not part of the debug session; and responsive to determining that the one or more other server requests are not part of the debug session, not adjusting a log level for actions associated with the one or more other server requests in accordance with the logging profile.

Clause 7. The method of any one of Clauses 1-6, further comprising: after generating the log entries, storing the log entries in a central log storage, wherein the central log storage is configured to output the log entries in response to a request for log entries that include the debug session identifier.

Clause 8. The method of any one of Clauses 1-7, further comprising: after generating the log entries, storing the log entries in a file, wherein other log entries that do not include the debug session identifier are not stored in the file; encrypting the file; and outputting the encrypted file in response to a request for log entries that include the debug session identifier.

Clause 9. The method of any one of Clauses 1-8, wherein: the debug session identifier is generated for the debug session by a frontend component of the client application; the debug session configuration comprises the debug session identifier; the server request comprises the debug session identifier; and determining that the server request is part of the debug session comprises determining that the server request comprises the debug session identifier.

Clause 10. The method of any one of Clauses 1-9, wherein: the server request comprises a debug flag; and determining that the server request is part of the debug session comprises determining that the debug flag in the server request is set.

Clause 11. The method of any one of Clauses 1-10, further comprising: responsive to receiving the configuration, generating the debug session identifier; and transmitting the debug session identifier to the client application.

Clause 12. The method of Clause 11, wherein: the configuration further comprises an indication of a user associated with the debug session; the server request comprises an indication of a user associated with the server request and does not comprise the debug session identifier; and determining that the server request is part of the debug session comprises determining that the user associated with the server request matches the user associated with the debug session.

Clause 13. A computing system configured to host a software platform, comprising: at least one hardware processor; at least one memory coupled to the at least one hardware processor; a client application; a plurality of backend components; a logger configured to generate log entries for actions performed by the backend components; and one or more non-transitory computer-readable media having stored therein computer-executable instructions that, when executed by the computing system, cause the computing system to perform: receiving a configuration for a debug session from the client application, wherein the configuration indicates that a debug session is active and specifies respective log levels for the backend components; receiving a server request; determining that the server request is part of the debug session; at the logger, adjusting log levels for actions performed by the backend components in response to the server request to the respective log levels for the backend components; and generating, using the logger, log entries for the actions performed by the backend components in response to the server request at the respective log levels for the backend components, wherein generating the log entries includes inserting a debug session identifier in the respective log entries.

Clause 14. The system of Clause 13, wherein: the debug session identifier comprises a string of characters that uniquely identifies the debug session.

Clause 15. The system of Clause 13 or Clause 14, wherein: the client application comprises a frontend component; the debug session identifier is generated for the debug session by the frontend component; the configuration comprises the debug session identifier; the server request comprises the debug session identifier; and the presence of the debug session identifier in the server request serves as an indication that the server request is part of the debug session.

Clause 16. The system of any one of Clauses 13-15, wherein: the backend components comprise a debug session service; and the debug session identifier is generated by the debug session service.

Clause 17. The system of Clause 16, wherein: the configuration further comprises an indication of a user associated with the debug session; the server request comprises an indication of a user associated with the server request and does not comprise the debug session identifier; and the user associated with the debug session matching the user associated with the server request serves as an indication that the server request is part of the debug session.

Clause 18. One or more non-transitory computer-readable media comprising computer-executable instructions that, when executed by a computing system, cause the computing system to perform operations comprising: receiving a request to initiate a debug session via a user interface of a client application of a software platform, wherein the request comprises configuration data for the debug session, and wherein the configuration data specifies respective log levels for components of a backend of the software platform; responsive to the request to initiate the debug session: generating a debug session identifier for the debug session; and transmitting the configuration data and the debug session identifier to the backend of the software platform to initiate the debug session; and during the debug session: receiving an input via the user interface; generating a server request based on the input; modifying the server request to include an indication that the server request is associated with the debug session; and transmitting the server request to the backend of the software platform.

Clause 19. The computer-readable media of Clause 18, wherein modifying the server request to include the indication that the server request is associated with the debug session comprises at least one of the following: modifying the server request to include the debug session identifier; or setting a debug session flag in the server request.

Clause 20. The computer-readable media of Clause 18 or Clause 19, wherein the operations further comprise displaying the debug session identifier via the user interface.

Example 11—Example Advantages

A number of advantages can be achieved via the technologies described herein.

As one example, significant improvements to the performance of the software platform (including the performance of individual components thereof such as processors) are achieved by the technologies described herein. Enabling the debug log level system-wide, as in existing techniques, has a significant negative performance impact on all requests and negatively affects the overall system performance. With the debug session approach described herein, only the performance of the individual session is affected and any negative impact on overall system performance is small. Relatedly, as computing time generates costs, the total operating cost of the systems is reduced as compared to systems in which the debug log level is enabled system-wide for debugging. Further, system-wide application of the debug log level can stress infrastructure and even provoke downtimes. Because the techniques described herein apply the debug log level selectively rather than globally, improved reliability and availability are achieved.

As another example, in prior debugging approaches, customer support and development teams are tasked with recreating the issue scenario reported by customers. This leads to high effort for the support and development teams, as well as long turn-around times and frequent customer involvement. In contrast, in the approaches described herein, the user who observed the issue is asked to reproduce it during a debug session while log levels of backend sever components are dynamically adjusted. The resulting log entries should be sufficient to analyze 80-90% of incidents without further developer action. This can save several hours of communication and setup time for customers and vendors per ticket.

As yet another example, the technologies described herein can advantageously reduce the time it takes to solve an issue observed by a customer. Because the customer who directly observed the issue is tasked with reproducing the issue and triggering collection of relevant information, it is not necessary for developers to try to reproduce the issue. This saves time for development teams and leads to faster resolution of incidents. Relatedly, quicker resolution of customer incidents means that developers have more time that can be spent elsewhere. As consequence, developer efficiency will increase.

Further, the technologies described herein can facilitate analysis and handover among developers and quality engineers. Software developers and quality engineers may extensively test their applications themselves; in this process, a significant amount of time may be spent to identify an issue in another team's component and then hand over the issue. The approach described herein can be used to streamline this process. For example, a developer on one development team can observe an issue with another team's component, reproduce the issue in a debug session, and then hand over the corresponding debug identifier to the development team responsible for the affected component. That development team can then analyze the issue as though it were an incident in a productive landscape.

Furthermore, the technologies described herein can avoid loss of relevant log entries due to log rotation. For example, servers may allocate a specified amount of storage for logs (e.g., 100 MB); when the storage limit is reached, the oldest logs are removed. This process is referred to as log rotation. In existing approaches in which log levels are globally increased during debugging, log entries may be generated so quickly that log rotation occurs every hour or so. This can be especially problematic because the previously generated logs are no longer available after the log rotation has occurred and thus cannot be analyzed. In contrast, because the approaches described herein dynamically adjust log levels such that only server requests associated with an active debug session are logged at a higher level, it is less likely that log rotation will occur prematurely.

Moreover, the technologies described herein can increase customer satisfaction. For example, the technologies described herein quicker ticket resolution, fewer communication roundtrips, and easier steps to follow for incident processing will also lead to a higher customer satisfaction. In addition, because only relevant server requests are logged for a given debug session, performance impact of debugging is reduced relative to existing approaches (e.g., approaches in which the log level of an entire application is globally increased or a large data export is needed).

Example 12—Example Computing Systems

Figure 7:
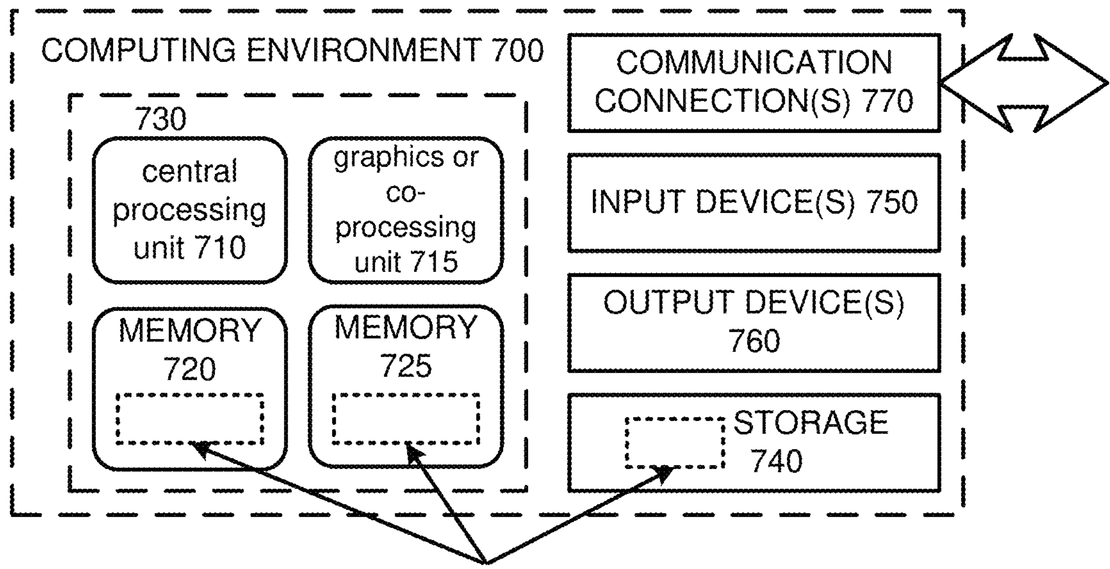
FIG. 7 is a block diagram of an example computing system in which described embodiments can be implemented.

FIG. 7 depicts an example of a suitable computing system 700 in which the described innovations can be implemented. The computing system 700 is not intended to suggest any limitation as to scope of use or functionality of the present disclosure, as the innovations can be implemented in diverse computing systems.

With reference to FIG. 7, the computing system 700 includes one or more processing units 710, 715 and memory 720, 725. In FIG. 7, this basic configuration 730 is included within a dashed line. The processing units 710, 715 execute computer-executable instructions, such as for implementing the features described in the examples herein. A processing unit can be a general-purpose central processing unit (CPU), processor in an application-specific integrated circuit (ASIC), or any other type of processor. In a multi-processing system, multiple processing units execute computer-executable instructions to increase processing power. For example, FIG. 7 shows a central processing unit 710 as well as a graphics processing unit or co-processing unit 715. The tangible memory 720, 725 can be volatile memory (e.g., registers, cache, RAM), non-volatile memory (e.g., ROM, EEPROM, flash memory, etc.), or some combination of the two, accessible by the processing unit(s) 710, 715. The memory 720, 725 stores software 780 implementing one or more innovations described herein, in the form of computer-executable instructions suitable for execution by the processing unit(s) 710, 715.

A computing system 700 can have additional features. For example, the computing system 700 includes storage 740, one or more input devices 750, one or more output devices 760, and one or more communication connections 770, including input devices, output devices, and communication connections for interacting with a user. An interconnection mechanism (not shown) such as a bus, controller, or network interconnects the components of the computing system 700. Typically, operating system software (not shown) provides an operating environment for other software executing in the computing system 700, and coordinates activities of the components of the computing system 700.

The tangible storage 740 can be removable or non-removable, and includes magnetic disks, magnetic tapes or cassettes, CD-ROMs, DVDs, or any other medium which can be used to store information in a non-transitory way and which can be accessed within the computing system 700. The storage 740 stores instructions for the software 780 implementing one or more innovations described herein.

The input device(s) 750 can be an input device such as a keyboard, mouse, pen, or trackball, a voice input device, a scanning device, touch device (e.g., touchpad, display, or the like) or another device that provides input to the computing system 700. The output device(s) 760 can be a display, printer, speaker, CD-writer, or another device that provides output from the computing system 700.

The communication connection(s) 770 enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, or other carrier.

The innovations can be described in the context of computer-executable instructions, such as those included in program modules, being executed in a computing system on a target real or virtual processor (e.g., which is ultimately executed on one or more hardware processors). Generally, program modules or components include routines, programs, libraries, objects, classes, components, data structures, etc. that perform particular tasks or implement particular abstract data types. The functionality of the program modules can be combined or split between program modules as desired in various embodiments. Computer-executable instructions for program modules can be executed within a local or distributed computing system.

For the sake of presentation, the detailed description uses terms like "determine" and "use" to describe computer operations in a computing system. These terms are high-level descriptions for operations performed by a computer and should not be confused with acts performed by a human being. The actual computer operations corresponding to these terms vary depending on implementation.

Example 13—Computer-Readable Media

Any of the computer-readable media herein can be non-transitory (e.g., volatile memory such as DRAM or SRAM, nonvolatile memory such as magnetic storage, optical storage, or the like) and/or tangible. Any of the storing actions described herein can be implemented by storing in one or more computer-readable media (e.g., computer-readable storage media or other tangible media). Any of the things (e.g., data created and used during implementation) described as stored can be stored in one or more computer-readable media (e.g., computer-readable storage media or other tangible media). Computer-readable media can be limited to implementations not consisting of a signal.

Any of the methods described herein can be implemented by computer-executable instructions in (e.g., stored on, encoded on, or the like) one or more computer-readable media (e.g., computer-readable storage media or other tangible media) or one or more computer-readable storage devices (e.g., memory, magnetic storage, optical storage, or the like). Such instructions can cause a computing system to perform the method. The technologies described herein can be implemented in a variety of programming languages.

Example 14—Example Cloud Computing Environment

Figure 8:
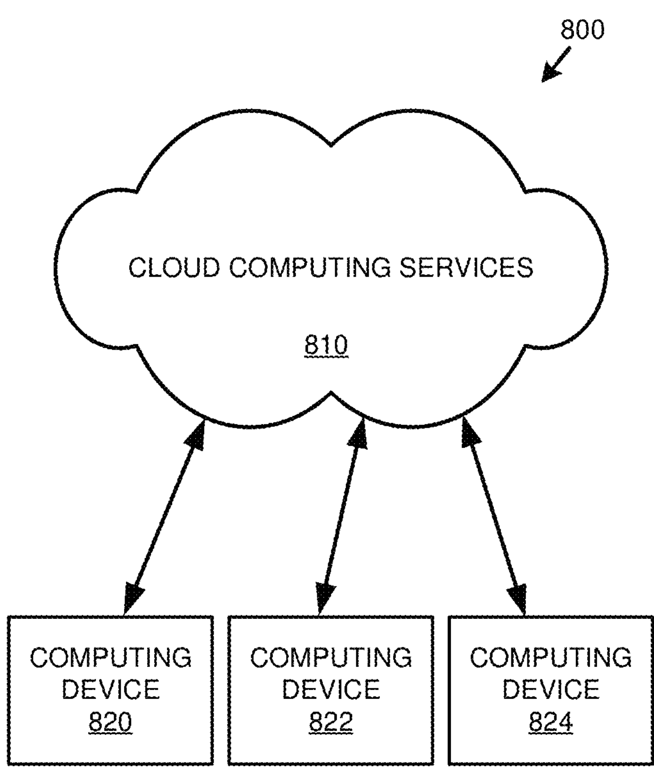
FIG. 8 is a block diagram of an example cloud computing environment that can be used in conjunction with the technologies described herein.

FIG. 8 depicts an example cloud computing environment 800 in which the described technologies can be implemented, including, e.g., the system 100 of FIG. 1 and other systems herein. The cloud computing environment 800 comprises cloud computing services 810. The cloud computing services 810 can comprise various types of cloud computing resources, such as computer servers, data storage repositories, networking resources, etc. The cloud computing services 810 can be centrally located (e.g., provided by a data center of a business or organization) or distributed (e.g., provided by various computing resources located at different locations, such as different data centers and/or located in different cities or countries).

The cloud computing services 810 are utilized by various types of computing devices (e.g., client computing devices), such as computing devices 820, 822, and 824. For example, the computing devices (e.g., 820, 822, and 824) can be computers (e.g., desktop or laptop computers), mobile devices (e.g., tablet computers or smart phones), or other types of computing devices. For example, the computing devices (e.g., 820, 822, and 824) can utilize the cloud computing services 810 to perform computing operations (e.g., data processing, data storage, and the like).

In practice, cloud-based, on-premises-based, or hybrid scenarios can be supported.

Example 15—Example Implementations

Although the operations of some of the disclosed methods are described in a particular, sequential order for convenient presentation, such manner of description encompasses rearrangement, unless a particular ordering is required by specific language set forth herein. For example, operations described sequentially can in some cases be rearranged or performed concurrently.

Example 16—Example Alternatives

The technologies from any example can be combined with the technologies described in any one or more of the other examples. In view of the many possible embodiments to which the principles of the disclosed technology can be applied, it should be recognized that the illustrated embodiments are examples of the disclosed technology and should not be taken as a limitation on the scope of the disclosed technology. Rather, the scope of the disclosed technology includes what is covered by the scope and spirit of the following claims.

What is claimed is:

1. A computer-implemented method comprising:

receiving a debug session configuration from a client application of a software platform, wherein the debug session configuration comprises an indication that a debug session is active and a logging profile for the debug session;

receiving a server request from the client application;

determining that the server request is part of the debug session;

adjusting a log level for actions associated with the server request in accordance with the logging profile; and generating log entries for the actions associated with the server request at the adjusted log level, wherein generating the log entries includes inserting a debug session identifier in the respective log entries.

2. The method of claim 1, wherein:

the logging profile specifies respective log levels for one or more backend components of the software platform for actions associated with the debug session; and adjusting the log level for the actions associated with the server request in accordance with the logging profile comprises adjusting current respective log levels of the one or more backend components to the respective log levels specified in the logging profile.

3. The method of claim 2, wherein:

the respective log levels for the one or more backend components specified in the logging profile are selected from the group consisting of an error log level, a warning log level, an info log level, a debug log level, and a custom log level; and the debug log level is a higher log level than the info log level, the warning log level, and the error log level.

4. The method of claim 1, wherein:

the logging profile specifies a log level for one or more backend components of the software platform for actions associated with the debug session; and adjusting the log level for the actions associated with the server request in accordance with the logging profile comprises increasing a current log level of the one or more backend components for actions associated with the debug session to a higher log level.

5. The method of claim 1, wherein the debug session identifier comprises a string of characters that uniquely identifies the debug session.

6. The method of claim 1, further comprising:

receiving one or more other server requests while the debug session is active;

determining that the one or more other server requests are not part of the debug session; and responsive to determining that the one or more other server requests are not part of the debug session, not adjusting a log level for actions associated with the one or more other server requests in accordance with the logging profile.

7. The method of claim 1, further comprising:

after generating the log entries, storing the log entries in a central log storage, wherein the central log storage is configured to output the log entries in response to a request for log entries that include the debug session identifier.

8. The method of claim 1, further comprising:

after generating the log entries, storing the log entries in a file, wherein other log entries that do not include the debug session identifier are not stored in the file;

encrypting the file; and outputting the encrypted file in response to a request for log entries that include the debug session identifier.

9. The method of claim 1, wherein:

the debug session identifier is generated for the debug session by a frontend component of the client application;

the debug session configuration comprises the debug session identifier;

the server request comprises the debug session identifier; and determining that the server request is part of the debug session comprises determining that the server request comprises the debug session identifier.

10. The method of claim 1, wherein:

the server request comprises a debug flag; and determining that the server request is part of the debug session comprises determining that the debug flag in the server request is set.

11. The method of claim 1, further comprising:

responsive to receiving the configuration, generating the debug session identifier; and transmitting the debug session identifier to the client application.

12. The method of claim 11, wherein:

the configuration further comprises an indication of a user associated with the debug session;

the server request comprises an indication of a user associated with the server request and does not comprise the debug session identifier; and determining that the server request is part of the debug session comprises determining that the user associated with the server request matches the user associated with the debug session.

13. A computing system configured to host a software platform, comprising:

at least one hardware processor;

at least one memory coupled to the at least one hardware processor;

a client application;

a plurality of backend components;

a logger configured to generate log entries for actions performed by the backend components; and one or more non-transitory computer-readable media having stored therein computer-executable instructions that, when executed by the computing system, cause the computing system to perform:

receiving a configuration for a debug session from the client application, wherein the configuration indicates that a debug session is active and specifies respective log levels for the backend components;

receiving a server request;

determining that the server request is part of the debug session;

at the logger, adjusting log levels for actions performed by the backend components in response to the server request to the respective log levels for the backend components; and generating, using the logger, log entries for the actions performed by the backend components in response to the server request at the respective log levels for the backend components, wherein generating the log entries includes inserting a debug session identifier in the respective log entries.

14. The system of claim 13, wherein:

the debug session identifier comprises a string of characters that uniquely identifies the debug session.

15. The system of claim 13, wherein:

the client application comprises a frontend component;

the debug session identifier is generated for the debug session by the frontend component;

the configuration comprises the debug session identifier;

the server request comprises the debug session identifier; and the presence of the debug session identifier in the server request serves as an indication that the server request is part of the debug session.

16. The system of claim 13, wherein:

the backend components comprise a debug session service; and the debug session identifier is generated by the debug session service.

17. The system of claim 16, wherein:

the configuration further comprises an indication of a user associated with the debug session;

the server request comprises an indication of a user associated with the server request and does not comprise the debug session identifier; and the user associated with the debug session matching the user associated with the server request serves as an indication that the server request is part of the debug session.

18. One or more non-transitory computer-readable media comprising computer-executable instructions that, when executed by a computing system, cause the computing system to perform operations comprising:

receiving a request to initiate a debug session via a user interface of a client application of a software platform, wherein the request comprises configuration data for the debug session, and wherein the configuration data specifies respective log levels for components of a backend of the software platform;

responsive to the request to initiate the debug session:

generating a debug session identifier for the debug session; and transmitting the configuration data and the debug session identifier to the backend of the software platform to initiate the debug session; and during the debug session:

receiving an input via the user interface;

generating a server request based on the input;

modifying the server request to include an indication that the server request is associated with the debug session; and transmitting the server request to the backend of the software platform.

19. The computer-readable media of claim 18, wherein modifying the server request to include the indication that the server request is associated with the debug session comprises at least one of the following:

modifying the server request to include the debug session identifier; or setting a debug session flag in the server request.

20. The computer-readable media of claim 18, wherein the operations further comprise displaying the debug session identifier via the user interface.

* * * * *